US008782442B2

(12) United States Patent
Woo et al.

(10) Patent No.: US 8,782,442 B2
(45) Date of Patent: Jul. 15, 2014

(54) APPARATUS AND METHOD FOR MULTI-POINT DETECTION IN POWER-OVER-ETHERNET DETECTION MODE

(75) Inventors: Agnes Woo, Encino, CA (US); Anil Tammineedi, Los Angeles, CA (US); Ichiro Fujimori, Irvine, CA (US); David Chin, Los Altos, CA (US); John Perzow, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 502 days.

(21) Appl. No.: 12/754,400

(22) Filed: Apr. 5, 2010

(65) Prior Publication Data
US 2010/0257381 A1  Oct. 7, 2010

Related U.S. Application Data

(63) Continuation of application No. 11/653,956, filed on Jan. 17, 2007, now Pat. No. 7,711,967.

(60) Provisional application No. 60/758,984, filed on Jan. 17, 2006.

(51) Int. Cl.
G06F 1/26      (2006.01)
G01R 31/08     (2006.01)

(52) U.S. Cl.
USPC ............................ 713/300; 324/522

(58) Field of Classification Search
None
See application file for complete search history.

(56) References Cited

U.S. PATENT DOCUMENTS

| | | | |
|---|---|---|---|
| 3,846,787 A | 11/1974 | Myers et al. |
| 4,215,317 A | 7/1980 | Traynor |
| 4,990,845 A | 2/1991 | Gord |
| 5,081,379 A | 1/1992 | Korteling |
| 5,220,207 A | 6/1993 | Kovalcik et al. |
| 5,457,811 A | 10/1995 | Lemson |
| 5,519,310 A | 5/1996 | Bartlett |
| 5,789,971 A | 8/1998 | Colletti et al. |
| 5,838,145 A | 11/1998 | Poon et al. |
| 5,943,226 A | 8/1999 | Kim |
| 6,002,237 A | 12/1999 | Gaza |
| 6,011,413 A | 1/2000 | Hayakawa et al. |
| 6,184,659 B1 | 2/2001 | Darmawaskita |
| 6,198,342 B1 | 3/2001 | Kawai |
| 6,280,081 B1 | 8/2001 | Blau et al. |
| 6,300,749 B1 | 10/2001 | Castelli et al. |

(Continued)

OTHER PUBLICATIONS

International Search Report for PCT/US2007/001119, Filed Jan. 17, 2007, 14 pages.

(Continued)

Primary Examiner — Kim Huynh
Assistant Examiner — Vincent Chang
(74) Attorney, Agent, or Firm — Sterne, Kessler, Goldstein & Fox PLLC

(57) ABSTRACT

An apparatus and method for multi-point detection in a power source equipment (PSE) device is provided. During multi-point detection, a series of at least four currents is sequentially applied to a link port of the PSE device. Each current is applied during a different measurement interval. A voltage measurement sample is obtained for each of the measurement intervals. A difference in voltage between alternating voltage samples is determined and used by a detection module to determine whether a valid power device is coupled to the link port of the PSE.

24 Claims, 18 Drawing Sheets

(56) References Cited

U.S. PATENT DOCUMENTS

| | | | |
|---|---|---|---|
| 6,304,472 B1 | 10/2001 | Nagasu et al. | |
| 6,335,657 B1 | 1/2002 | Hayase et al. | |
| 6,414,404 B1 | 7/2002 | Allen | |
| 6,452,766 B1 | 9/2002 | Carper | |
| 6,456,044 B1 | 9/2002 | Darmawaskita | |
| 6,456,156 B1 | 9/2002 | Frey et al. | |
| 6,480,057 B2 | 11/2002 | Ogura | |
| 6,515,489 B2 | 2/2003 | Min et al. | |
| 6,535,983 B1 * | 3/2003 | McCormack et al. | 713/310 |
| 6,600,690 B1 | 7/2003 | Nahas et al. | |
| 6,717,787 B2 | 4/2004 | Barker | |
| 6,734,717 B2 | 5/2004 | Min | |
| 6,750,701 B2 | 6/2004 | Kawasumi | |
| 6,798,177 B1 | 9/2004 | Liu et al. | |
| 6,853,180 B2 | 2/2005 | Neumann et al. | |
| 6,940,737 B2 | 9/2005 | Nakazawa et al. | |
| 6,960,949 B2 | 11/2005 | Suzuki | |
| 6,998,831 B2 | 2/2006 | Charlon | |
| 7,046,983 B2 | 5/2006 | Elkayam et al. | |
| 7,050,315 B2 | 5/2006 | Itoh | |
| 7,061,327 B2 | 6/2006 | Doy | |
| 7,061,328 B2 | 6/2006 | Doy | |
| 7,124,041 B1 | 10/2006 | Johnson et al. | |
| 7,161,393 B1 | 1/2007 | Potanin et al. | |
| 7,183,857 B2 | 2/2007 | Doy et al. | |
| 7,262,605 B2 | 8/2007 | Seo et al. | |
| 7,262,628 B2 | 8/2007 | Southwell et al. | |
| 7,281,141 B2 | 10/2007 | Elkayam et al. | |
| 7,372,685 B2 | 5/2008 | Beck et al. | |
| 7,373,528 B2 | 5/2008 | Schindler | |
| 7,417,877 B2 | 8/2008 | Leung et al. | |
| 7,432,696 B1 | 10/2008 | De Stasi | |
| 7,492,108 B2 | 2/2009 | Garcia et al. | |
| 7,525,333 B1 | 4/2009 | Bertin | |
| 7,547,619 B2 | 6/2009 | Sasaki et al. | |
| 7,548,626 B2 | 6/2009 | Stenberg et al. | |
| 7,564,214 B2 | 7/2009 | Sasaki et al. | |
| 7,592,899 B2 | 9/2009 | Holt et al. | |
| 7,593,747 B1 | 9/2009 | Karam et al. | |
| 7,612,470 B2 | 11/2009 | Pincu et al. | |
| 7,627,398 B1 | 12/2009 | Bennett et al. | |
| 7,711,967 B2 | 5/2010 | Woo et al. | |
| 7,782,094 B2 | 8/2010 | Vorenkamp | |
| 7,863,871 B2 | 1/2011 | Vorenkamp et al. | |
| 7,936,546 B2 | 5/2011 | Vorenkamp et al. | |
| 2002/0093366 A1 | 7/2002 | Fotouhi | |
| 2003/0099076 A1 | 5/2003 | Elkayam et al. | |
| 2003/0122551 A1 * | 7/2003 | Male | 324/607 |
| 2003/0155963 A1 | 8/2003 | Huang | |
| 2004/0008070 A1 | 1/2004 | Abe et al. | |
| 2004/0201931 A1 | 10/2004 | Korcharz et al. | |
| 2004/0227522 A1 * | 11/2004 | Male | 324/524 |
| 2005/0030200 A1 | 2/2005 | Holt | |
| 2005/0132240 A1 | 6/2005 | Stineman et al. | |
| 2005/0162202 A1 | 7/2005 | Suzuki | |
| 2005/0253645 A1 | 11/2005 | North | |
| 2006/0045531 A1 | 3/2006 | Killmeyer et al. | |
| 2006/0049818 A1 * | 3/2006 | Montgomery | 323/364 |
| 2006/0092000 A1 * | 5/2006 | Karam et al. | 340/310.11 |
| 2006/0112285 A1 | 5/2006 | Stineman | |
| 2006/0132220 A1 | 6/2006 | Lee | |
| 2006/0164769 A1 | 7/2006 | Stanford et al. | |
| 2006/0164775 A1 * | 7/2006 | Stineman et al. | 361/93.1 |
| 2007/0165345 A1 | 7/2007 | Woo | |
| 2007/0165548 A1 | 7/2007 | Woo et al. | |
| 2007/0170909 A1 | 7/2007 | Vorenkamp et al. | |
| 2007/0206774 A1 | 9/2007 | Vorenkamp et al. | |
| 2007/0296391 A1 | 12/2007 | Bertin et al. | |
| 2008/0040625 A1 | 2/2008 | Vorenkamp et al. | |
| 2008/0079434 A1 | 4/2008 | Oosawa et al. | |
| 2009/0096531 A1 | 4/2009 | Shimamoto et al. | |

OTHER PUBLICATIONS

Mendelson, G., "All You Need to Know About Power over Ethernet (POE) and the IEEE 802.3af Standard", Internet Citation [Online] Jun. 2004 (2004-2006), XP002372480 Retrieved from the Internet: <URL: http://www.powerdsine.com/Documentation/WhitePapers/PoE__and__IEE802__3af.pdf> [retrieved on Mar. 26, 2006].

802.3af™, IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI), IEEE Computer Society, IEEE, New York, NY, ISBN 0-7381-3696-4 (SS95132) (Print), ISBN 0-7381-3697-2 (SS95132) (PDF), Jun. 18, 2003, pp. i-ix and 1-121 (133 pages total).

Non-Final Office Action for U.S. Appl. No. 11/653,875, mailed Aug. 25, 2009, 8 pages.

Final Office Action for U.S. Appl. No. 11/653,875, mailed Jan. 28, 2010, 8 pages.

Non-Final Office Action for U.S. Appl. No. 11/653,875, mailed Mar. 26, 2010, 9 pages.

Non-Final Office Action for U.S. Appl. No. 11/653,875, mailed Jul. 22, 2010, 19 pages.

Final Office Action for U.S. Appl. No. 11/653,875, mailed Mar. 25, 2011, 21 pages.

Non-Final Final Office Action for U.S. Appl. No. 11/653,875, mailed Jul. 12, 2011, 12 pages.

Final Office Action for U.S. Appl. No. 11/653,875, mailed Dec. 1, 2011, 15 pages.

Non-Final Final Office Action for U.S. Appl. No. 11/653,875, mailed Apr. 9, 2012, 12 pages.

Non-Final Final Office Action for U.S. Appl. No. 11/653,875, mailed Sep. 27, 2012, 13 pgs.

Non-Final Office Action for U.S. Appl. No. 11/654,031, mailed Aug. 6, 2008, 21 pages.

Final Office Action for U.S. Appl. No. 11/654,031, mailed Feb. 26, 2009, 7 pages.

Non-Final Office Action for U.S. Appl. No. 11/654,031, mailed Aug. 24, 2009, 8 pages.

Non-Final Office Action for U.S. Appl. No. 11/797,041, mailed Mar. 26, 2010, 8 pages.

Non-Final Office Action for U.S. Appl. No. 11/797,041, mailed Sep. 1, 2010, 13 pages.

Non-Final Office Action for U.S. Appl. No. 11/797,040, mailed Oct. 16, 2009, 10 pages.

Final Office Action for U.S. Appl. No. 11/797,040, mailed Mar. 26, 2010, 10 pages.

Non-Final Office Action for U.S. Appl. No. 11/797,040, mailed Jun. 9, 2010, 10 pages.

* cited by examiner

APPARATUS AND METHOD FOR MULTI-POINT DETECTION IN POWER-OVER-ETHERNET DETECTION MODE

CROSS REFERENCE TO RELATED APPLICATIONS

This application is a continuation of U.S. patent application Ser. No. 11/653,956, filed Jan. 17, 2007, now allowed, which claims benefit of U.S. Provisional Patent No. 60/758,984, filed on Jan. 17, 2006, all of which are incorporated by reference herein in their entirety.

FIELD OF THE INVENTION

The present invention generally relates to Power over Ethernet (PoE) devices.

BACKGROUND OF THE INVENTION

Ethernet communications provide high speed data communications over a communications link between two communications nodes that operates according the IEEE 802 Ethernet Standard. The communications medium between the two nodes can be twisted pair wires for Ethernet, or other types communications medium that are appropriate. Power over Ethernet (PoE) communication systems provide power and data communications over a common communications link. More specifically, a power source device (PSE) connected to the physical layer of the first node of the communications link provides DC power (for example, 48 volts DC) to a powered device (PD) at the second node of the communications link. The DC power is transmitted simultaneously over the same communications medium with the high speed data from one node to the other node.

Example PD devices that utilize PoE include Internet Protocol (IP) phones, wireless access points, etc. The PSE device is often a data switch having has least two rows of data ports, where a data port in the input row of data ports can to be switched to any one of the data ports in the output row of data ports. Each data port typically includes a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

Despite the advantages of PoE, many existing communication links do not utilize PoE and transfer only pure data. Accordingly, some existing switches are data-only switches that do not support power transfer, i.e., they are non-PoE switches. However, in some configurations, these data-only switches may need to communicate with PD devices on a number of their data ports. In this scenario, a midspan switch is connected between the data-only switch and the PD devices in order to inject the DC power to operate the PD devices.

Prior to providing DC power to a PD, the PSE must first detect whether a valid PD is connected to the link. In typical detection operations, a PD is detected by modeling the relationship of PD current and voltage as linear. However, this model results in inaccuracies during detection operations when the PD coupled to the PSE does not follow this linear relationship.

What is needed is an apparatus and method to provide more accurate detection of a PD.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION 1.0 Overview

Figure 1:
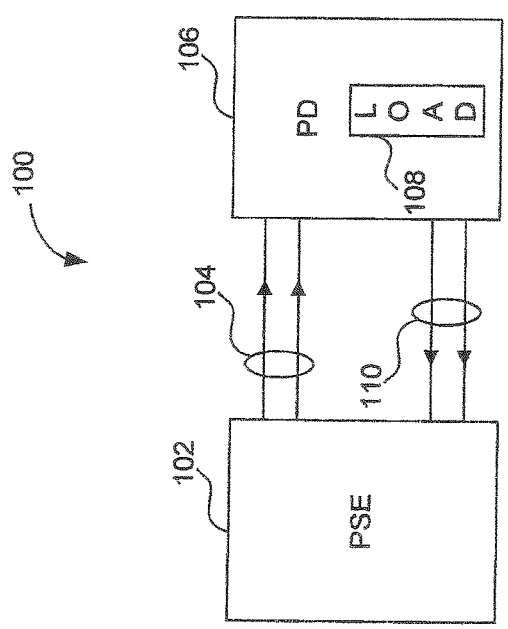
FIG. 1 is a block diagram of a conventional Power over Ethernet (PoE) system.

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

2.0 PoE Structural Embodiments

Figure 2A:
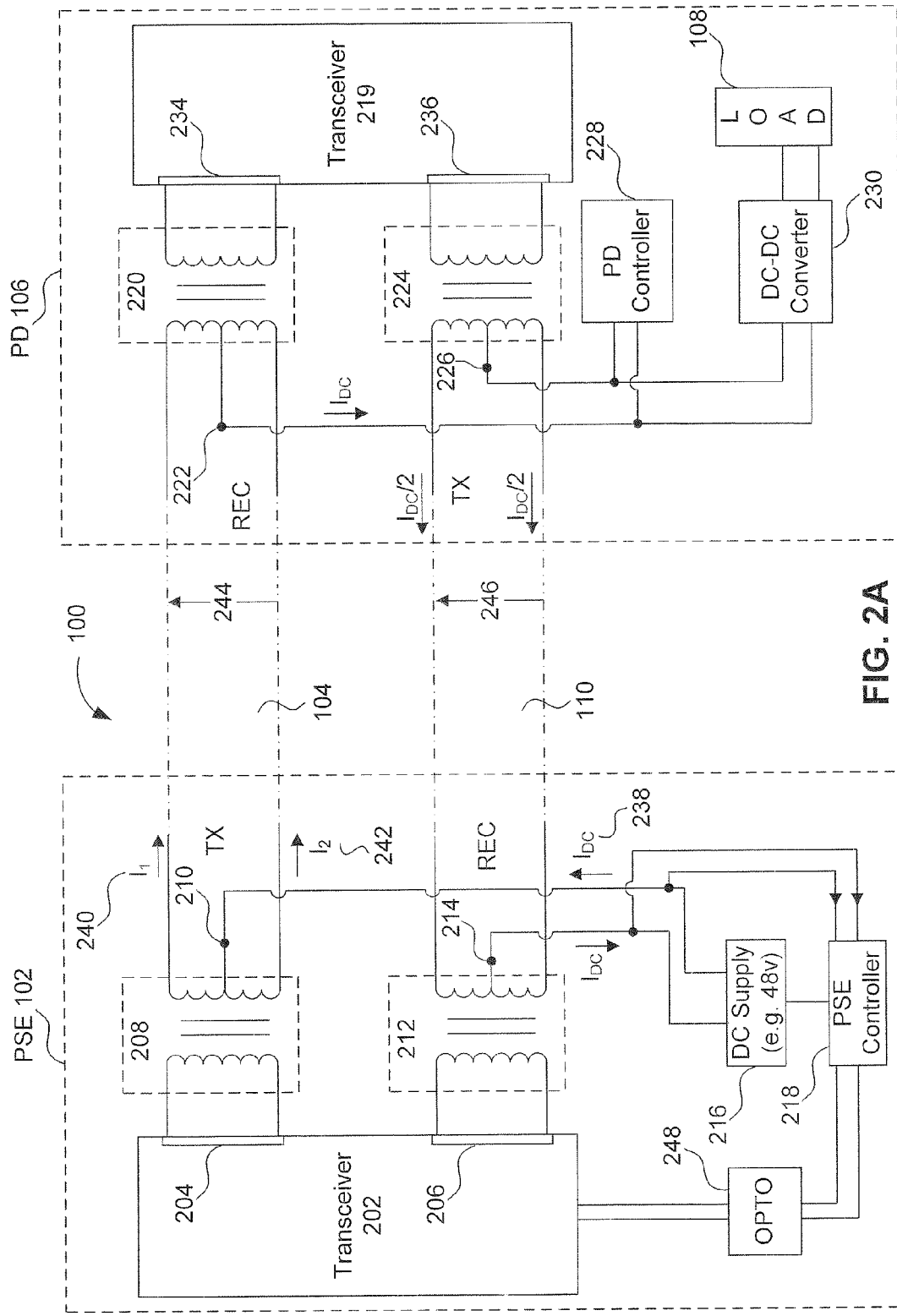
FIG. 2A illustrates a more detailed figure of the conventional power transfer from the Power Source Equipment (PSE) to the Powered Device (PD) in a PoE communications system.

FIG. 2A provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference. PSE controller 218 is described in further detail below in reference to FIG. 3.

Still referring to FIG. 2A, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not affected by the DC power transfer.

As discussed above, in one example, the PSE 102 is a data switch that that is communicating data traffic with one or more PD devices, such as Internet phones, or a wireless access point. The data switch has an input row of data ports and an output row of data ports, where any one of the input data ports can to be switched to any one of the output data ports. Each data port typically includes a serial-to-parallel (i.e. SERDES) transceiver so that data can be received and transmitted using high speed serial techniques, but are processed in parallel on chip.

Figure 2B:
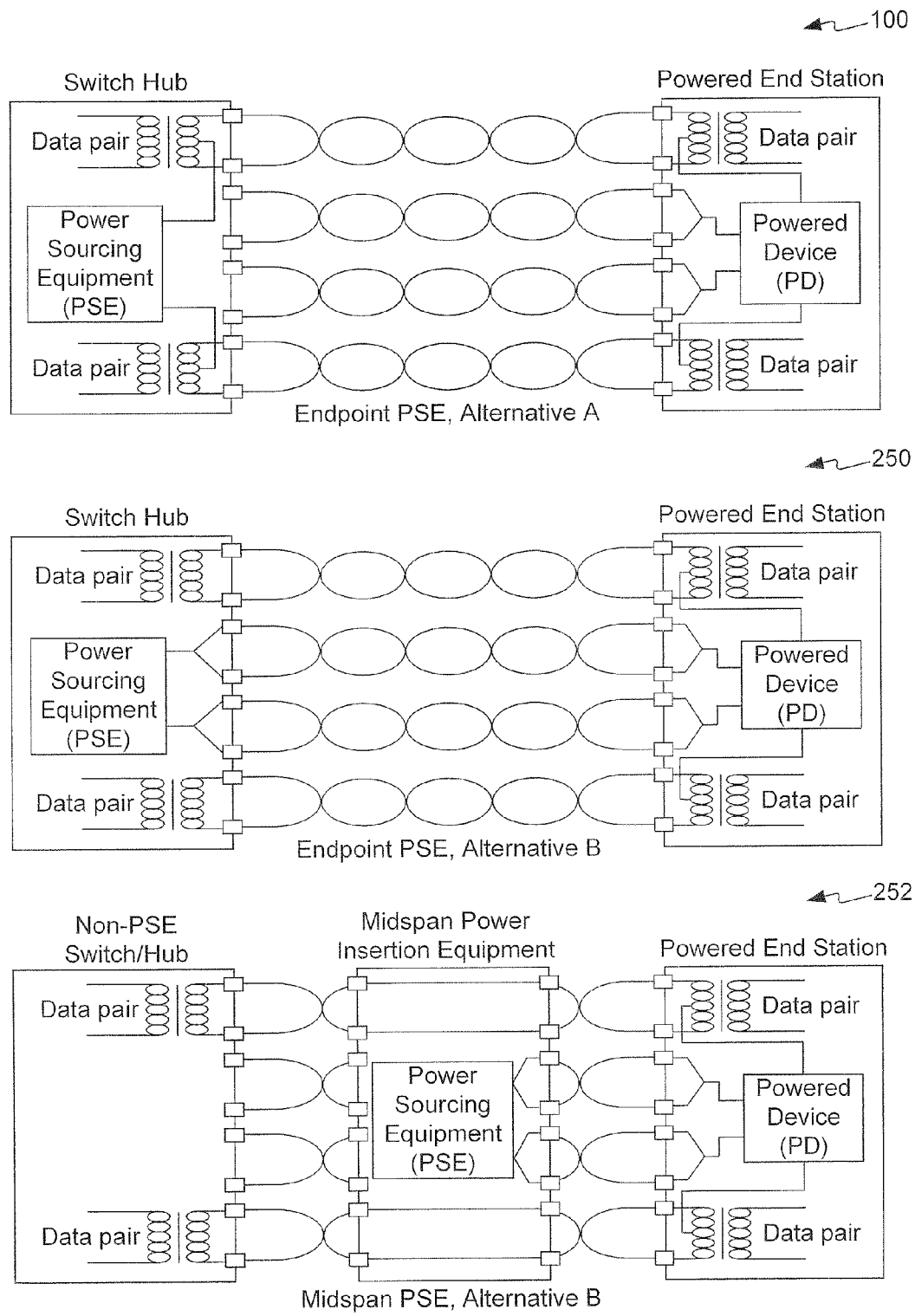
FIG. 2B illustrates exemplary configurations for supplying power from the Power Source Equipment (PSE) to the Powered Device (PD) in a PoE communications system.

Although FIG. 2A depicts one alternative for supplying power to a PD, as would be appreciated by persons of skill in the art, other alternatives can be used to supply power to a PD. For example, FIG. 2B illustrates exemplary configurations for supplying power from the PSE to the PD in a PoE communications system. The Endpoint PSE, Alternative A configuration 100 is the configuration for supplying power from the PSE to the PD as previously described in FIG. 2A. The Endpoint PSE, Alternative B configuration 250 represents a configuration for supplying power from the PSE to the PD where two pairs of conductors carry data and the remaining two pairs of conductors are used to power the PD. The Midspan PSE, Alternative B configuration 252 represents a configuration for supplying power from midspan power insertion equipment to the PD 106. The midspan power insertion equipment supplies power to the PD 106 via two dedicated pairs of conductors. Two separate pairs of conductors carry data between the midspan power insertion equipment and the PD 106. Further description of the Midspan PSE, Alternative B 252 is given in United States patent application entitled "Inband Management for Power Over Ethernet Midspans Using an Embedded Switch" filed on Sep. 12, 2006, which is incorporated herein by reference in its entirety.

Figure 3A:
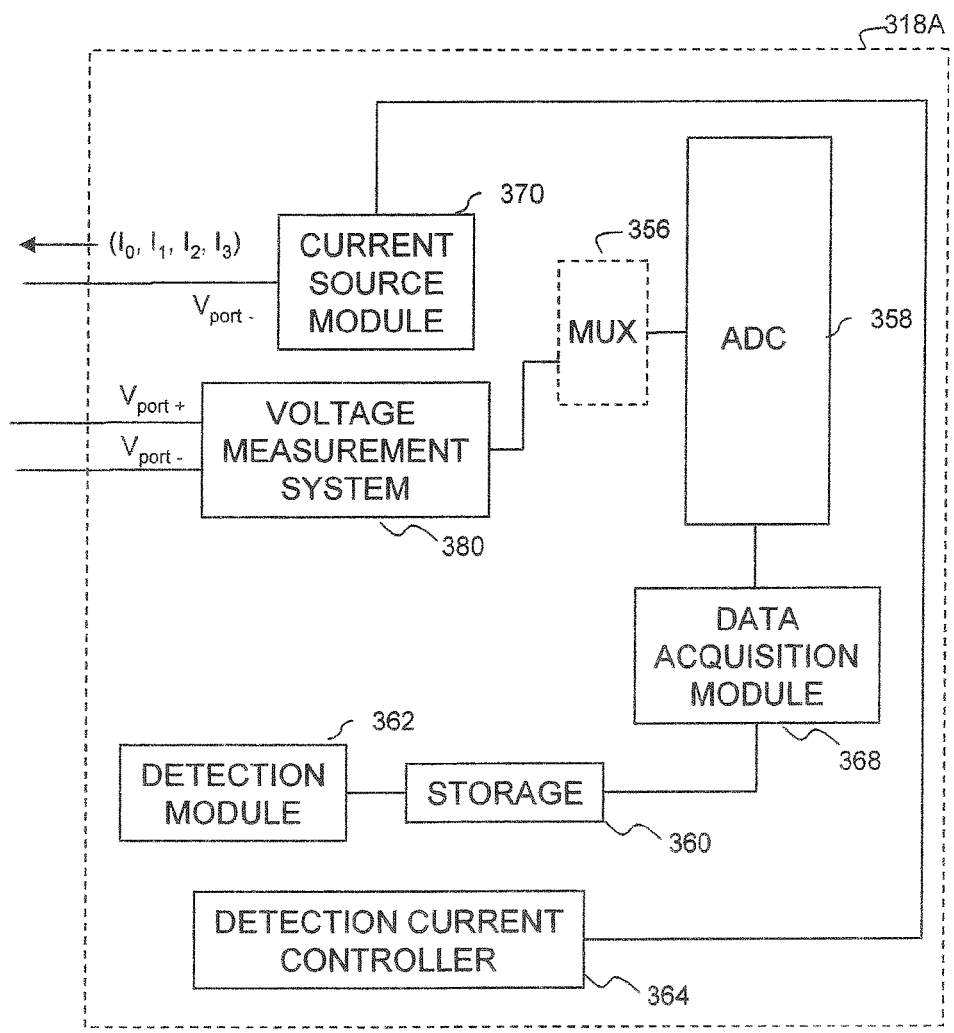
FIG. 3A depicts a block diagram of a PSE controller 318B having multi-port PD detection, according to embodiments of the present invention.

FIG. 3A depicts a block diagram of an exemplary power source equipment (PSE) controller 318A having multi-port PD detection, according to embodiments of the present invention. PSE controller 318A includes a current source module 370, a voltage measurement system 380, a detection module 362, a detection current controller 364, storage 360, and analog to digital converter (ADC) 358. To measure the resistance value of the PD detection signature load, current source 370 applies a current to the PD and voltage measurement system 380 measures the resulting voltage across the PD.

The transmit link portion and the receive link portion are coupled to corresponding ports $V_{port+}$ and $V_{port-}$ of the PSE controller. As described above, transmit link portion and receive link portion are associated with the same link. For ease of description, $V_{port+}$ and $V_{port-}$ are referred to collectively as a link port.

Current source module 370 is coupled, via $V_{port-}$, to the receive link portion. Current source module 370 is further coupled to detection current controller 364. Current source module 370 is configured to provide a sequence of currents to a PD detection signature load. The current level provided to PD detection signature during a detection interval is set by a control signal from detection current controller 364. An exemplary current source module 370 is described below in reference to FIG. 4.

Voltage measurement system 380 is coupled to $V_{port+}$ and $V_{port-}$ and to analog-to-digital converter (ADC) 358. In an embodiment, an optional multiplexer 356 is coupled between voltage measurement system 380 and ADC 358. Voltage measurement system 380 is configured to measure the voltage across the PD. The resulting analog measurements are sent to ADC 358. ADC 358 samples the received analog measurement at periodic intervals. An exemplary voltage measurement system 380 is described below in reference to FIG. 5.

Data acquisition module 368 receives the original samples from ADC 358. Data acquisition module 368 is configured to average a set of original samples received from ADC 358. For example, data acquisition module 368 may integrate 8 original samples to generate an integrated sample (e.g., a 1.152 msec sample). Data acquisition module 368 may further configured to integrate a set of integrated samples to generate a filtered sample. This second integration filters out the 50-60 Hz. For example, data acquisition module 368 integrates 16 of the 1.152 msec samples to generate an 18 msec sample. In an embodiment, the filtered samples are stored in storage 360.

Detection current controller 364 is coupled to the current source 370. Detection current controller 364 is configured to provide a series of control signals to current source 370 which sequentially activate one of a plurality of different current levels in current source 370. Although depicted as a separate module, detection current controller 364 may be included in detection module 362.

Detection module 362 is configured to determine whether a valid PD signature has been detected. For example, a valid PD signature is detected if the PD signature resistance is within a predefined range ($R_{good}$) and if the PD signature capacitance is within a predefined range ($C_{good}$). In an embodiment, detection module 362 obtains a set of voltage samples (e.g., voltage averages) from storage 360. The detection module 362 determines the voltage difference between samples. For example, a voltage difference between alternating samples is determined. The set of voltage difference indicates the deviation, if any, from a linear current-voltage relationship and is indicative of the PD signature resistance and PD signature capacitance.

Figure 3B:
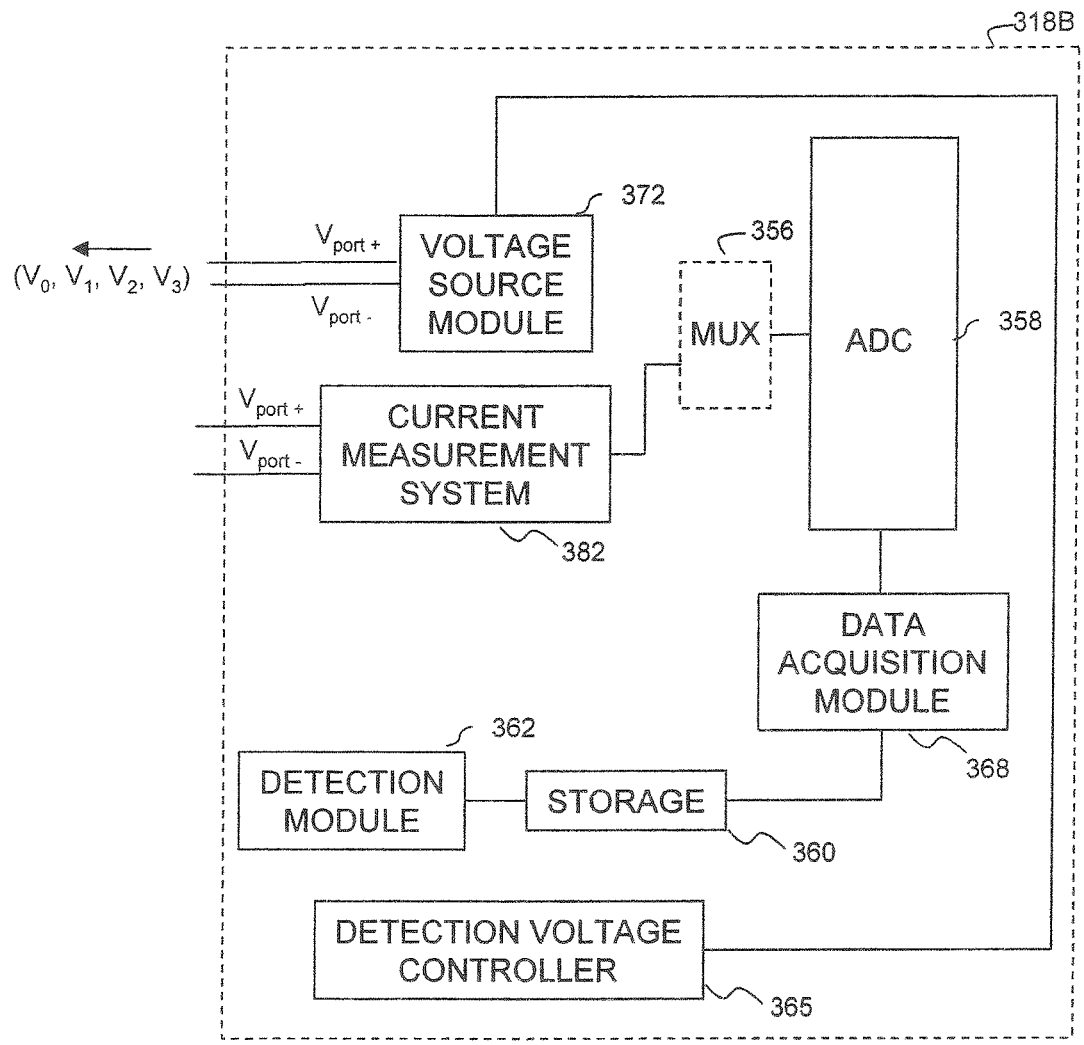
FIG. 3B depicts a block diagram of an alternate PSE controller having multi-port PD detection, according to embodiments of the present invention.

FIG. 3B depicts a block diagram of an alternate PSE controller 318B having multi-port PD detection, according to embodiments of the present invention. PSE controller 318B includes a voltage source module 372, a current measurement system 382, a detection module 362, a detection voltage controller 365, storage 360, and analog to digital converter (ADC) 358. To measure the resistance value of the PD detection signature load, voltage source 370 applies a voltage to the PD and current measurement system 382 measures the resulting current from the PD. Note that the current measured by current measurement system 382 may be converted to a voltage by current measurement system 382.

Voltage source module 372 is coupled, via $V_{port+}$ and $V_{port-}$, to the link. Voltage source module 372 is further coupled to detection voltage controller 365. Voltage source module 372 is configured to provide a sequence of voltages to a PD detection signature load. The voltage level provided to PD detection signature during a detection interval is set by a control signal from detection voltage controller 365.

Current measurement system 382 is coupled to $V_{port+}$ and/or $V_{port-}$ and to analog-to-digital converter (ADC) 358. In an embodiment, an optional multiplexer 356 is coupled between current measurement system 382 and ADC 358. Current measurement system 382 is configured to measure the current from the PD. The resulting analog measurements are sent to ADC 358. ADC 358 samples the received analog measurement at periodic intervals.

Detection voltage controller 365 is coupled to the voltage source 372. Detection voltage controller 365 is configured to provide a series of control signals to voltage source 372 which sequentially activate one of a plurality of different voltage levels in voltage source 370. Although depicted as a separate module, detection voltage controller 365 may be included in detection module 362.

Detection module 362 and data acquisition module 368 were described above in FIG. 3A.

Figure 4:
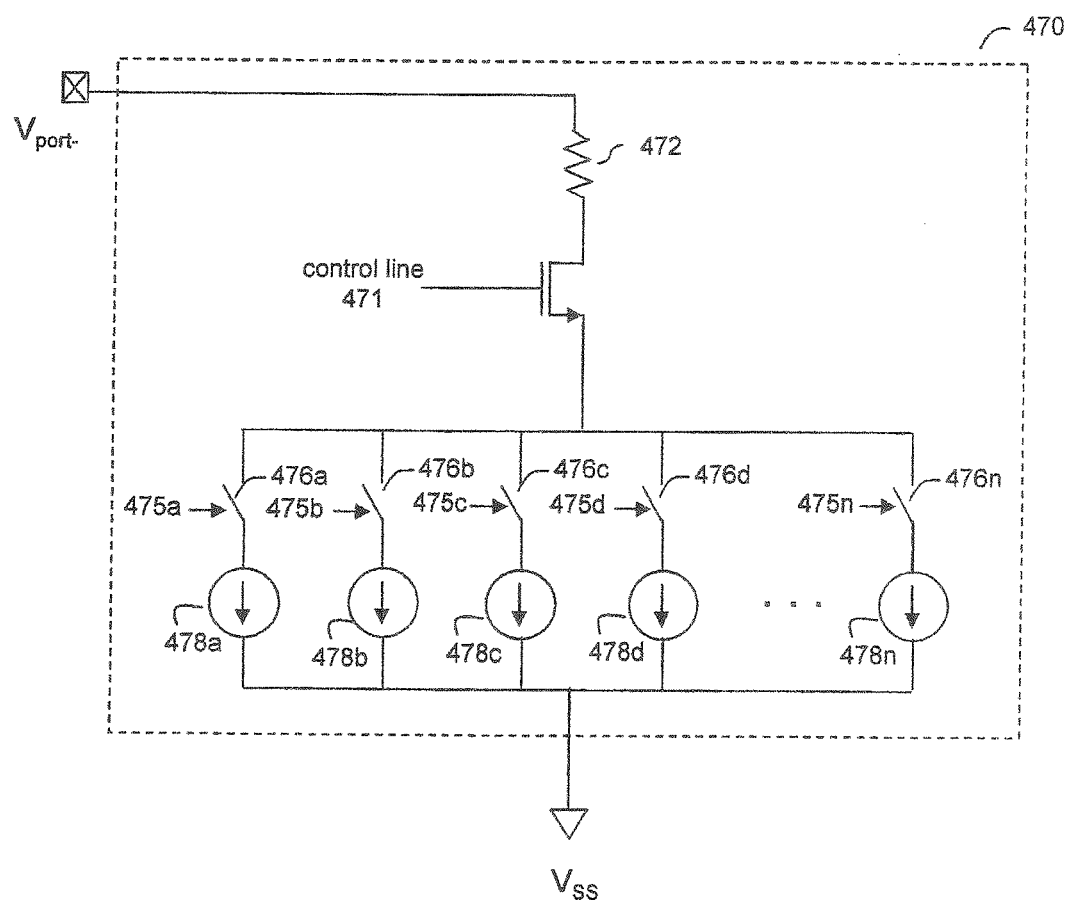
FIG. 4 depicts an exemplary current source module, according to embodiments of the present invention.

FIG. 4 depicts an exemplary current source module 470, according to embodiments of the present invention. In an embodiment, current source module 470 is a current digital-to-analog converter (iDAC). Current source module 470 includes a resistance 472, a transistor 474, a plurality of switches 476a-n, and a plurality of parallel current sources 478a-n.

Resistance 472 is coupled between $V_{port-}$ and transistor 474. In an embodiment, resistance 472 is a resistor. As would be appreciated by persons of skill in the art, other types of resistances can be used in the present invention. In an embodiment, transistor 474 is a double-Diffused Metal Oxide Semiconductor (DMOS) transistor. The drain of transistor 474 is coupled to resistance 472 and the source of transistor 474 is coupled to the plurality of switches 476a-n. The gate of transistor 474 is coupled to control line 471. Control line 471 is coupled to a suitable control source, such as a microprocessor. A control signal, applied to the control line 471, causes transistor 474 to conduct. When transistor 474 is conducting, switches 476a-n are coupled to $V_{port-}$, via resistance 472. As would be appreciated by persons of skill in the art, other types of transistors or similar devices can be used.

Each switch 476 is coupled to transistor 474 and a corresponding current source 478. Each current source is in turn coupled between a switch 476 and a voltage source $V_{ss}$. The plurality of switches is controlled by a control signal from detection current controller 364. When a switch is closed, its corresponding current source is coupled to transistor 474. For example, if current source module 470 includes four current sources 478a-d, a two-bit control signal is used to set switches 476a-d. In this example, a control signal of 10 may indicate that switches 476a and 476b are to be closed. Current sources 478a and 478b are then both coupled to transistor 474. If transistor 474 is conducting, the combined magnitude of current sources 478a and 478b is applied to the PD via resistance 472 and $V_{port-}$.

Figure 5:
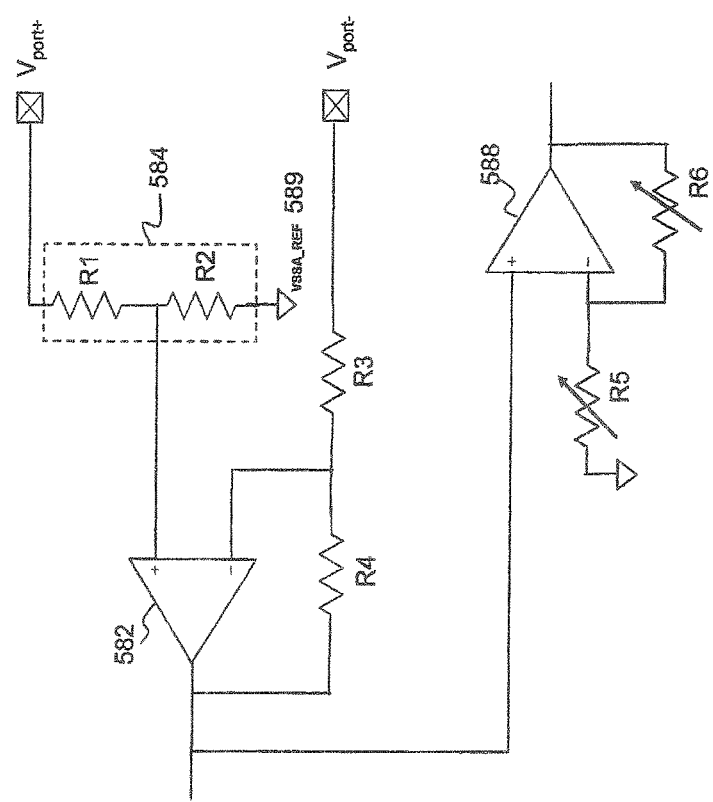
FIG. 5 depicts an exemplary voltage measurement system, according to embodiments of the present invention.

FIG. 5 depicts an exemplary voltage measurement system 580, according to embodiments of the present invention. Voltage measurement system 580 includes an amplifier 582 and an optional buffer amplifier 588. The non-inverting input of amplifier 582 is coupled between resistance R1 and resistance R2 of voltage divider 584. Resistance R1 is coupled between $V_{port+}$ and the non-inverting input of amplifier 582. Resistance R2 is coupled between the non-inverting input of amplifier 582 and supply voltage 589. A resistance R3 is coupled between $V_{port-}$ and the inverting input of amplifier 582. Resistance R4 is coupled between the inverting input of amplifier 582 and the output of amplifier 582.

When present, the non-inverting input of buffer amplifier 588 is coupled to the output of amplifier 582. A resistance R5 is coupled between the inverting input of buffer amplifier 588 and ground. A resistance R6 is coupled between the inverting input and the output of buffer amplifier 588. In an embodiment, resistances R5 and R6 are variable resistances. Voltage measurement system 580 may be used to measure voltage in a variety of modes of operation of the PSE controller. The gain of buffer amplifier 588 may be varied based on the mode of operation of PSE controller. For example, in a power mode of operation, the gain of buffer amplifier is set to one and in a detection mode of operation, the gain of buffer amplifier is set to 5.625. The gain of buffer amplifier 588 may be varied by changing the values of resistance R5 and/or resistance R6.

In an embodiment, one or more of resistances R1-R6 may be a resistor. As would be appreciated by persons of skill in the art, other types of resistances can be used for resistances R1-R6.

Figure 6A:
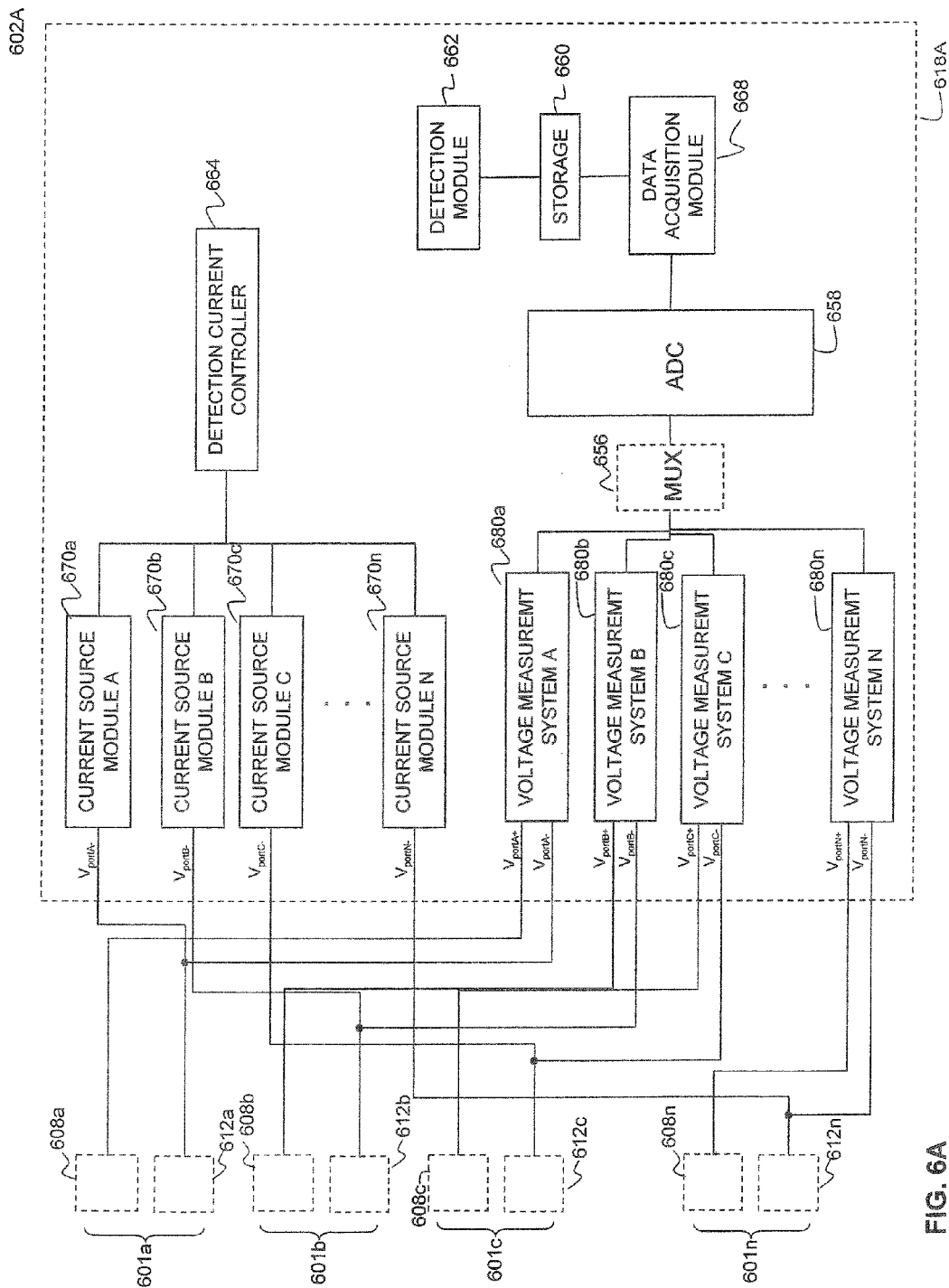
FIG. 6A depicts a block diagram of an exemplary power source equipment (PSE) having multi-point PD detection for a plurality of PDs, according to embodiments of the present invention.

FIG. 6A depicts a block diagram of power source equipment (PSE) 602A having multi-point PD detection for a plurality of PDs, according to embodiments of the present invention. PSE 602A includes a plurality of links 601a-n. Each link 601 includes transmit portion 608 and a receive portion 612. PSE 602A also includes a PSE controller 618A having multi-port PD detection for a plurality of PD devices.

PSE controller 618A includes a plurality of current source modules 670a-n, a plurality of voltage measurement systems 680a-n, a detection module 662, a detection current controller 664, storage 660, a multiplexer 656, and analog to digital converter (ADC) 658. PSE controller 618 includes a plurality of link ports, each link port having a $V_{port+}$ coupled to the transmit port of its associated link and a $V_{port-}$ coupled to the receive port of its associated link.

Each current source module 670 is coupled to a corresponding link 601. That is, current source module 670a is coupled to link 601a, current source module 670b is coupled to link 601b, and so on. In an alternate embodiment, a current source module 670 is coupled to multiple links 601. An exemplary current source module is described above in reference to FIG. 4.

Each current source module 670 is coupled, via $V_{port-}$, to the receive portion of its corresponding link 601. Current source module 670 is further coupled to detection current controller 664. Current source module 670 is configured to provide a sequence of currents to a PD detection signature load. The current level provided to PD detection signature during a detection interval is set by a control signal from detection current controller 664.

Detection current controller 664 is coupled to the plurality of current sources 670a-n. Detection current controller 664 is configured to provide a series of control signals to each current source 670 which sequentially activate one of a plurality of different current levels in current source 670. In an embodiment, the plurality of current sources 670 provides current to their corresponding ports in parallel. Alternatively, current sources 670 provide current to their corresponding ports sequentially.

In an embodiment, each voltage measurement system 680 is coupled to a corresponding link 601. That is, voltage measurement system 680a is coupled to link 601a, voltage measurement system 680b is coupled to link 601b, and so on. In an alternate embodiment, a voltage measurement system 680 is coupled to multiple links 601. An exemplary voltage measurement system is described above in reference to FIG. 5.

Voltage measurement system 680 is coupled, via $V_{port+}$, to the transmit portion 208 and via $V_{port-}$, to the receive portion of its corresponding link 601. Multiplexer 656 is coupled between each voltage measurement system 680a-n and ADC 658. Voltage measurement system 680 is configured to measure the voltage across a PD coupled to its corresponding link 601. The resulting analog measurements from each voltage measurement system 680a-n are sent to ADC 358 via multiplexer 656. ADC 658 samples the received analog measurements at periodic intervals.

Figure 7:
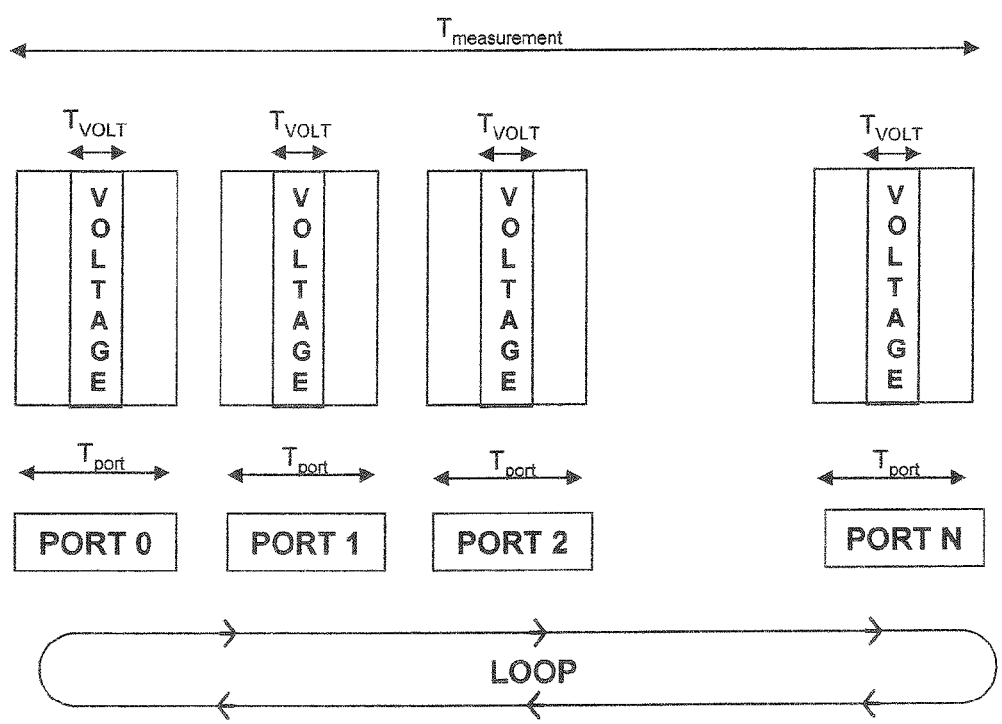
FIG. 7 is an illustration of an exemplary time division multiplexing scheme, according to an embodiment of the present invention.

In an embodiment, PSE controller 602 implements a time division multiplexing scheme where the outputs of a plurality of voltage measurement systems 680a-n are multiplexed into a single data stream then digitized by ADC 658. FIG. 7 is an illustration of an exemplary time division multiplexing scheme, according to an embodiment of the present invention.

In the time division multiplexing scheme illustrated in FIG. 7, a total measurement time period, $T_{measurement}$, is established during which one voltage measurement for each of the N link ports is taken. Additionally, a link port measurement time period, $T_{port}$, is established during which measurements for a single link port must be made. Measurements taken for a link port include a voltage measurement and may also include current and temperature measurements taken by other systems of PSE controller 602. In an embodiment, link port measurement time periods, $T_{port}$, are equal for each port. In this embodiment, the link port measurement time period, $T_{port}$, is determined by dividing the total measurement time period, $T_{measurement}$, by the number of link ports supported by the PSE controller. As would be appreciated by persons of skill in the art, other mechanisms for allocating port time measurement periods across a plurality of ports could be used with the present invention. Within the port measurement time period, $T_{port}$, a voltage measurement time period, $T_{volt}$, may also be established. The voltage measurement time period may be used when PSE controller 602 makes multiple types of measurements (e.g., current and temperature) per port. The voltage measurement time period, $T_{volt}$, may in turn be divided into two phases: a first phase to select the correct settings to the multiplexer such as the port settings and to start the analog to digital conversion, and a second phase to wait for the end of conversion and to capture the ADC results.

In an exemplary 4-port PSE controller, the total measurement time period, $T_{measurement}$ is set to 144 μsec. Accordingly, the link port measurement time period, $T_{port}$, is 36 μsec per port. If current and temperature are also to be measured, the link port measurement time period is divided into three equal measurement periods. Thus, the voltage measurement time period, $T_{volt}$, for a link port may be set to 12 μsec.

ADC 658 periodically samples the received data stream from multiplexer 656 (referred to herein as "original samples" for ease of description.). Data acquisition module 368 receives the original samples from ADC 358. Data acquisition module 368 is configured to average a set of original samples received from ADC 358. For example, data acquisition module 368 may integrate 8 original samples to generate an integrated sample (e.g., a 1.152 msec sample). Data acquisition module 368 may integrate a set of integrated samples to generate a filtered sample.

Detection module 662 is configured to determine whether a valid PD signature has been detected for a port. For example, a valid PD signature is detected if the PD signature resistance is within a predefined range ($R_{good}$) and if the PD signature capacitance is within a predefined range ($C_{good}$). In an embodiment, detection module 362 obtains a set of voltage samples (e.g., voltage averages) from storage 360. The detection module 362 determines the voltage difference between samples. For example, a voltage difference between alternating samples is determined. The set of voltage difference indicates the deviation, if any, from a linear current-voltage relationship and is indicative of the PD signature resistance and PD signature capacitance.

Figure 8:
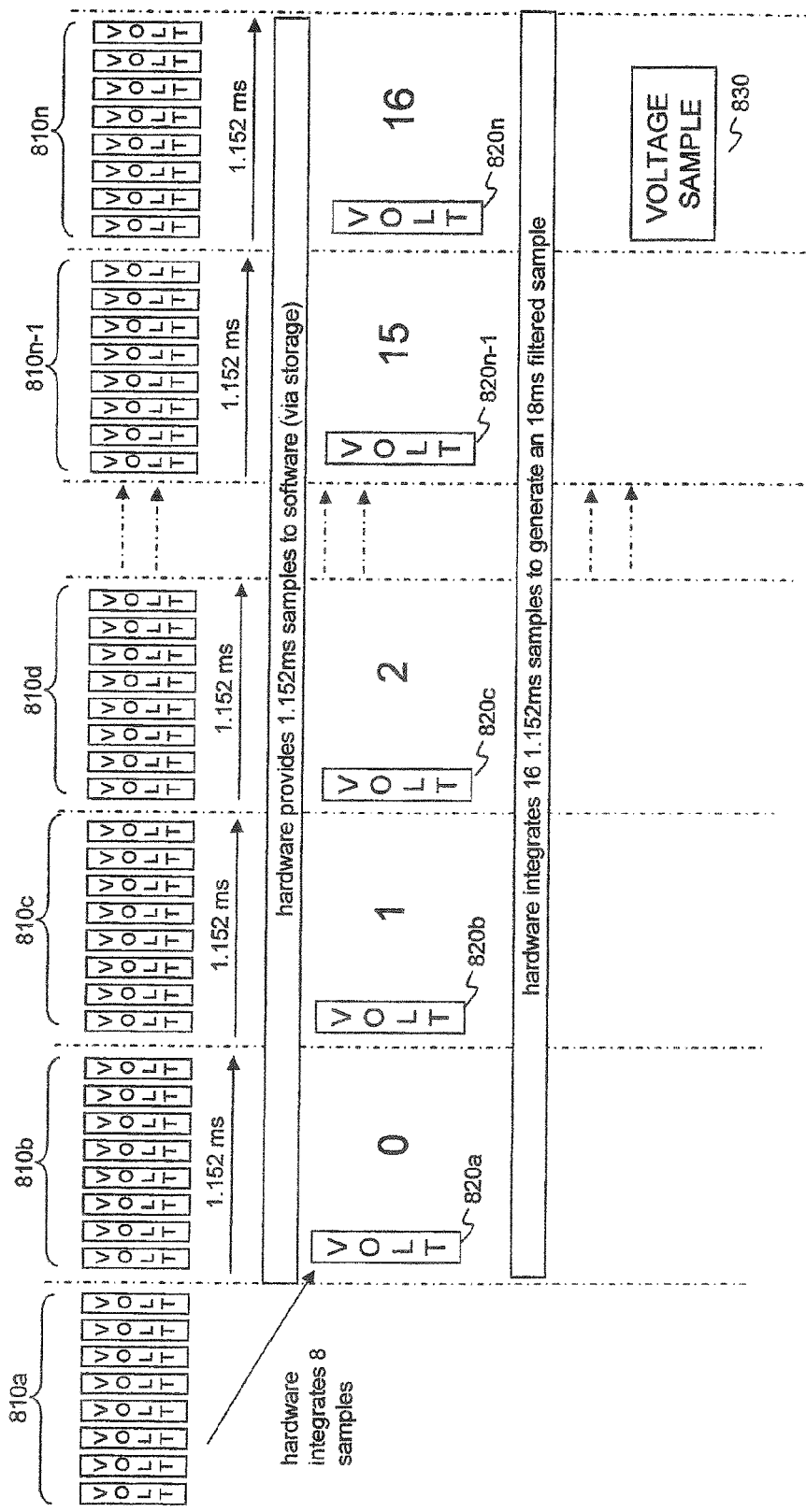
FIG. 8 illustrates a diagram of an exemplary sampling scheme used by PSE controller for a single port, according to an embodiment of the present invention.

FIG. 8 illustrates a diagram of an exemplary sampling scheme used by PSE controller 602 for a single link port, according to an embodiment of the present invention. The sampling scheme includes a plurality of logical sample sets 810a-n. Each logical sample set 810 includes a plurality of original samples taken by ADC 656. As described above, an original voltage sample for a link port is taken once during each total measurement time period, $T_{measurement}$. In the example of FIG. 8, an original voltage sample for the link port is taken once every 144 μsec. Because the sample set 810 includes 8 original voltage samples, the duration of the sample set 810 is 8*144 μsec or 1.152 ms.

The data acquisition module 668 integrates the original samples in each data set to generate an integrated voltage sample 820. An integrated voltage sample 820 is generated for a sample set. Thus, in the example of FIG. 8, an integrated voltage sample 820 is generated every 1.152 ms. It is noted that the original samples in one or more sample sets may be ignored in order to allow the analog measurement signal to settle. The data acquisition module 668 also integrates 16 of the integrated voltage samples 820 to filter out 50-60 Hz. The integrated sample is referred to herein as a filtered voltage sample 830. Thus, in the example of FIG. 8, a filtered voltage sample 830 is generated every 18 msec.

Figure 6B:
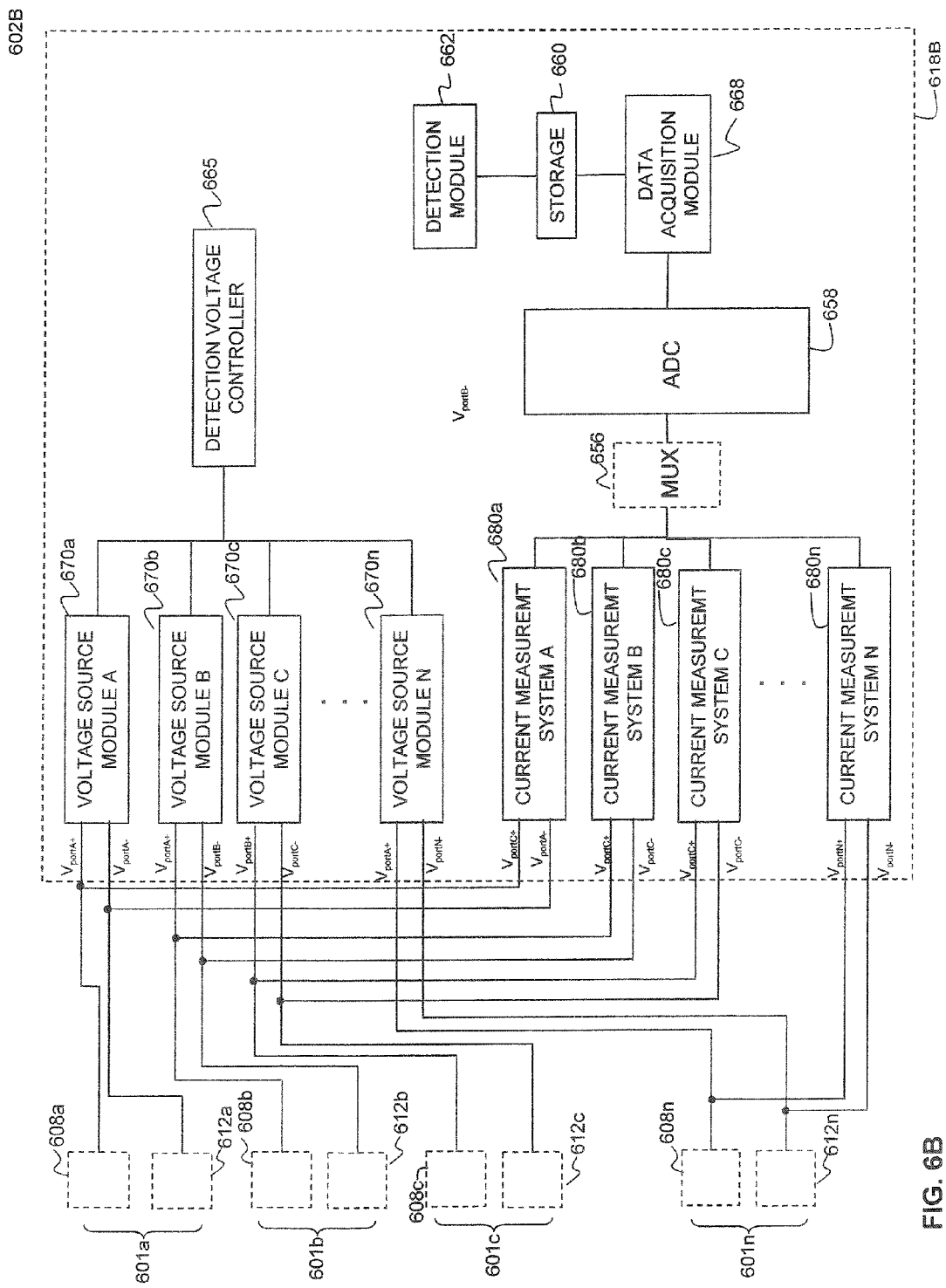
FIG. 6B depicts a block diagram of an alternate exemplary power source equipment (PSE) having multi-point PD detection for a plurality of PDs, according to embodiments of the present invention.

FIG. 6B depicts a block diagram of power source equipment (PSE) 602B having multi-point PD detection for a plurality of PDs, according to embodiments of the present invention. PSE 602B includes a plurality of links 601a-n. Each link 601 includes transmit portion 608 and a receive portion 612. PSE 602B also includes a PSE controller 618B having multi-port PD detection for a plurality of PD devices.

PSE controller 618B includes a plurality of voltage source modules 672a-n, a plurality of current measurement systems 682a-n, a detection module 662, a detection voltage controller 665, storage 660, a multiplexer 656, and analog to digital converter (ADC) 658. PSE controller 618B includes a plurality of link ports, each link port having a $V_{port+}$ coupled to the transmit port of its associated link and a $V_{port-}$ coupled to the receive port of its associated link.

Each voltage source module 672 is coupled to a corresponding link 601. That is, voltage source module 672a is coupled to link 601a, voltage source module 670b is coupled to link 601b, and so on. In an alternate embodiment, a voltage source module 672 is coupled to multiple links 601.

Each voltage source module 672 is coupled, via $V_{port+}$ and $V_{port-}$, to the transmit and receive portions of its corresponding link 601. Voltage source module 672 is further coupled to detection voltage controller 665. Voltage source module 672 is configured to provide a sequence of voltages to a PD detection signature load. The voltage level provided to PD detection signature during a detection interval is set by a control signal from detection voltage controller 665.

Voltage current controller 665 is coupled to the plurality of voltage sources 672a-n. Detection voltage controller 665 is configured to provide a series of control signals to each voltage source 672 which sequentially activate one of a plurality of different voltage levels in voltage source 672. In an embodiment, the plurality of voltage sources 672 provides voltage to their corresponding ports in parallel. Alternatively, voltage sources 672 provide voltage to their corresponding ports sequentially.

In an embodiment, each current measurement system 682 is coupled to a corresponding link 601. That is, current measurement system 682a is coupled to link 601a, current measurement system 682b is coupled to link 601b, and so on. In an alternate embodiment, a current measurement system 682 is coupled to multiple links 601.

Current measurement system 682 is coupled, via $V_{port+}$, to the transmit portion 208 and/or via $V_{port-}$, to the receive portion of its corresponding link 601. Multiplexer 656 is coupled between each voltage measurement system 680a-n and ADC 658. Current measurement system 682 is configured to measure the current from a PD coupled to its corresponding link. Note that the current measured by current measurement system 382 may be converted to a voltage by current measurement system 382. The resulting analog measurements from each current measurement system 680a-n are sent to ADC 358 via multiplexer 656. ADC 658 samples the received analog measurements at periodic intervals.

Figure 9:
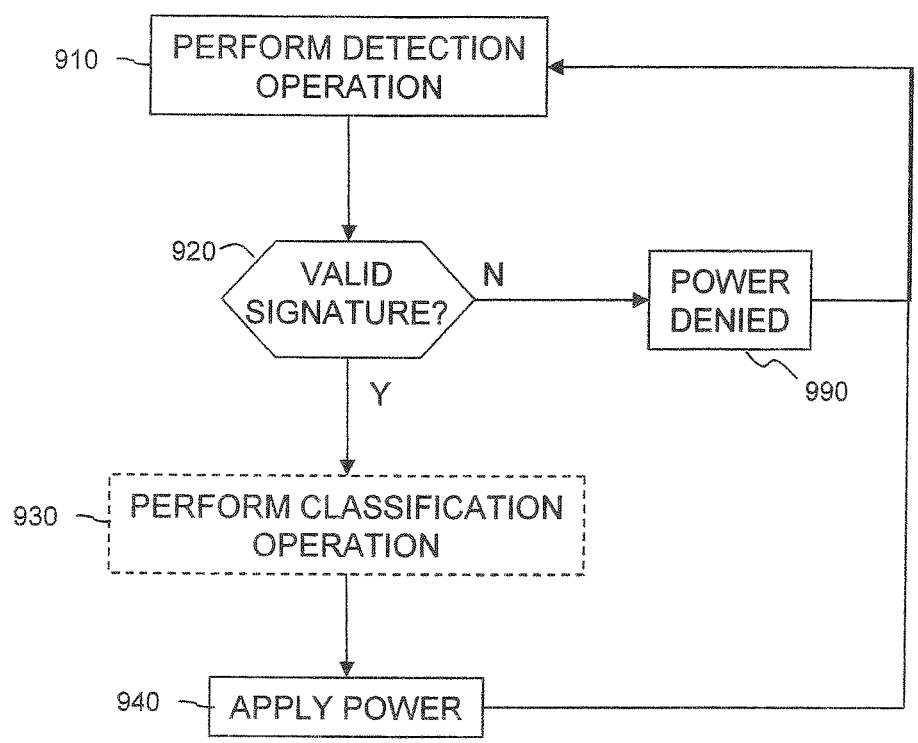
FIG. 9 depicts a flowchart of the exemplary flowchart of operations in a PSE, according to embodiment of the present invention.

Detection module 662 and data acquisition module 668 were described above in FIG. 6A 3.0 Methods for PD Detection FIG. 9 depicts a flowchart 900 of the exemplary modes of operation in a PSE, according to embodiment of the present invention. Flowchart 900 is described with continued reference to the embodiment of FIG. 6. However, flowchart 900 is not limited to that embodiment. Note that the steps of flowchart 900 do not necessarily have to occur in the order shown.

In step 910, PSE 602 performs detection operations. A PSE does not apply operating power to a PD until the PSE has successfully detected a valid PD. A variety of methods for performing detection can be used by a PSE. For example, a PSE may support legacy PD detection in addition to IEEE 802.3af type detection. Additionally, a PSE may support multiple types of IEEE 802.3af type detection such as two-point detection and multi-point detection. Multi-point detection processing is described below in reference to FIGS. 10 and 11. Two-point detection processing is described below in reference to FIGS. 12 and 13 and legacy detection is described below in reference to FIG. 14.

During detection processing, PSE determines whether a valid signature has been detected for the PD. For example, the PSE determines whether the PD signature resistance is within a predefined range ($R_{good}$) and whether the PD signature capacitance is within a predefined range ($C_{good}$). $R_{good}$ may be set to a value between 19 k$\Omega$ and 26.5 k$\Omega$ and $C_{good}$ may be set to a value between 0 and 650 nF.

In step 920, a determination is made whether a valid PD signature has been detected. If a valid PD signature is detected, operation proceeds to step 930. If a valid PD signature is not detected, operation proceeds to step 990.

In step 930, PSE 602 performs classification processing. Step 930 is optional. During classification processing, PSE determines the classification type of a detected PD. Classification processing is described in further detail in U.S. patent application Ser. No. 11/653,875, entitled "Power Over Ethernet Controller Integrated Circuit," filed Jan. 17, 2007, which is herein incorporated by reference in its entirety.

In step 940, PSE 602 applies the appropriate power to the PD. Operation than returns to step 910.

In step 990, power is denied for the PD. Operation than returns to step 910.

In an embodiment, PSE 602 performs detection processing at periodic intervals. Alternatively, PSE 602 may continuously perform detection processing for its link ports.

3.1 Multi-Point Detection

Figure 10:
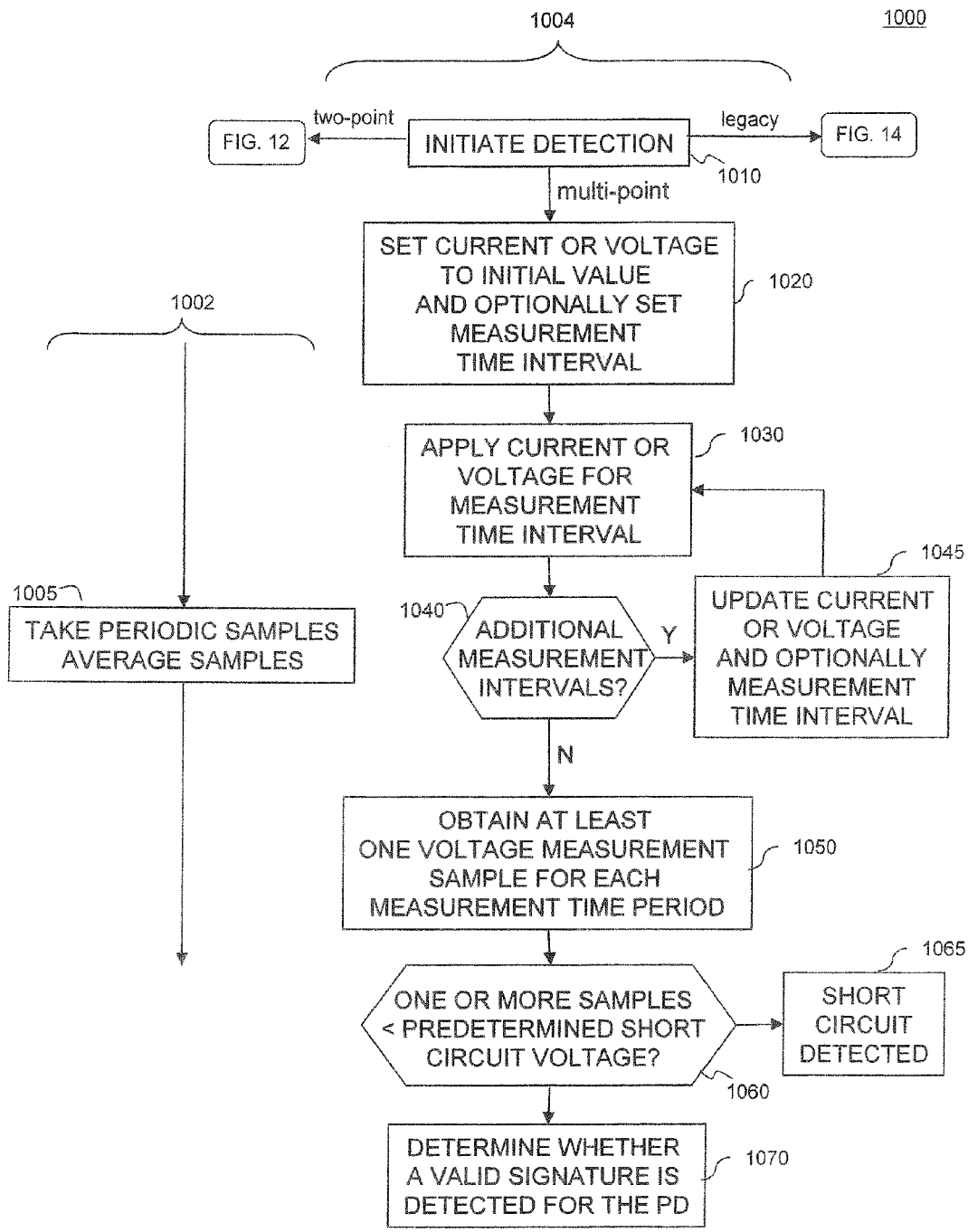
FIG. 10 depicts a flowchart of a method for multi-point detection, according to embodiments of the present invention.

FIG. 10 depicts a flowchart 1000 of a method for multi-point detection, according to embodiments of the present invention. During multi-point detection, N different currents or voltages are applied to a link port and accordingly, N measurements are used to determine whether a valid PD detected. N represents the number of points of detection used by the PSE. Flowchart 1000 is described with continued reference to the embodiment of FIG. 3. However, flowchart 1000 is not limited to that embodiment. Note that the steps depicted in flowchart 1000 do not necessarily have to occur in the order shown.

Flowchart 1000 includes a measurement process 1002 and a multi-point detection process 1004. Measurement process 1002 occurs substantially in parallel with multi-point detection process 1004. Measurement process includes step 1005. Multi-point detection process 1004 includes steps 1010-1070.

In step 1005, PSE 302 takes periodic samples of the measured voltage or current. Additionally, in step 1005, the original samples may be averaged. For example, the samples may be integrated to generate integrated samples and those integrated samples may be further integrated to generate filtered samples, as described above. Step 1005 occurs substantially in parallel with steps 1010-1050. Step 1005 may be decoupled from detection processing. That is, step 1005 may occur continuously during any mode of operation of the PSE.

In step 1010, detection is initiated. As described above, PSE 302 may support multiple types of detection. Therefore, as part of step 1010, a determination of the type of detection may be made. For example, a value representing the type of detection to be performed for a link port may be stored in storage 360. If multi-point detection is to be performed, operation proceeds to step 1020. If two-point detection is to be performed, operation proceeds to the flowchart of FIG. 12. If legacy detection is to be performed, operation proceeds to the flowchart of FIG. 14.

In step 1020, the current or voltage to be applied to the link port is set to an initial value. In an embodiment, detection controller transmits a signal to current source 370 or voltage source 372 to set the appropriate initial current or voltage level. In step 1020, the time interval for measurement (i.e., application of the initial current) is optionally set.

In step 1030, current or voltage is applied to the link port for the measurement time interval.

In step 1040, if additional measurement intervals remain, operation proceeds to step 1045. If no additional measurement intervals remain, operation proceeds to step 1050.

In step 1045, the value of the current or voltage to be applied to the link port is updated. In an embodiment, detection controller 364 transmits another signal to current source 370 or voltage source 372 to set the next level. Operation then returns to step 1030.

Figure 11:
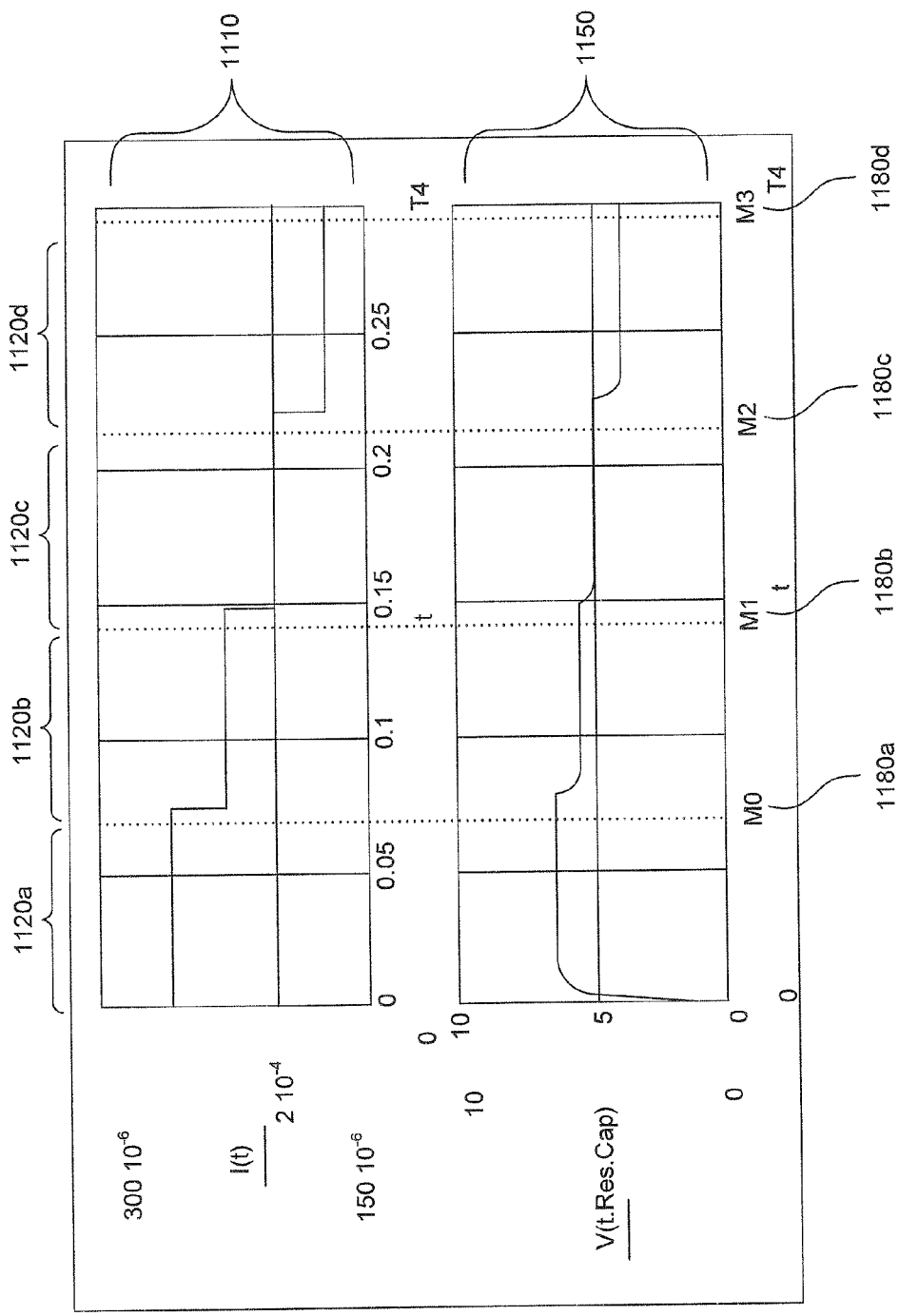
FIG. 11 depicts a typical four point detection current waveform, according to embodiments of the present invention.

Step 1030 is performed for each of the N points of detection. For example, if the PSE is using four-point detection, step 1030 is performed four times. FIG. 11 depicts a typical four point detection current waveform 1110, according to embodiments of the present invention. As shown in FIG. 11, current $I_0$ is applied to the link port during a first measurement time interval 1120a, current $I_1$ is applied to the link port during a second measurement time interval 1120b, current $I_2$ is applied to the link port during a third measurement time interval 1120c, and current $I_3$ is applied to the link port during a fourth measurement time interval 1120c. FIG. 11 also depicts the resulting detection voltage waveform 1150 measured by voltage measurement system 380, according to embodiments of the present invention.

In step 1050, at least one measurement sample is obtained for each measurement time interval. In an embodiment, detection module 362 obtains a filtered sample 830 corresponding to each measurement interval. In the example of FIG. 11, four 18 msec filtered voltage samples corresponding to measurement points M0-M3 1180a-d are obtained.

In step 1060, detection module 362 determines whether a short circuit condition is detected for the link port. Step 1060 is optional. In step 1060, a determination is made whether one or more of the voltage samples obtained in step 1050 is less than a predetermined short circuit voltage (e.g., 1V). If at least one voltage sample is less than the short circuit voltage, operation proceeds to step 1065. If none of the voltage samples is less than the short circuit voltage, operation proceeds to step 1070.

In step 1065, a short circuit is detected for the port.

In step 1070, detection module 362 uses the N measurement samples to determine whether a valid PD signature was detected. In the 4-point detection example of FIG. 11, the difference in link port voltage between measurement points is determined. For example, the differences between alternating sample points are computed:

$$\Delta V0 = \text{voltage at point } M0(V0) - \text{voltage at point } M2(V2)$$

$$\Delta V1 = \text{voltage at point } M1(V1) - \text{voltage at point } M3(V3)$$

A valid PD is detected if both ΔV0 and ΔV1 are within predefined voltage limits. The voltage difference and the predefined voltage limits are indicative of the PD signature resistance and PD signature capacitance. For example, for a valid PD signature, both ΔV0 and ΔV1 must in the range of 0.985V and 1.781V.

3.2 Two-Point Detection

Figure 12:
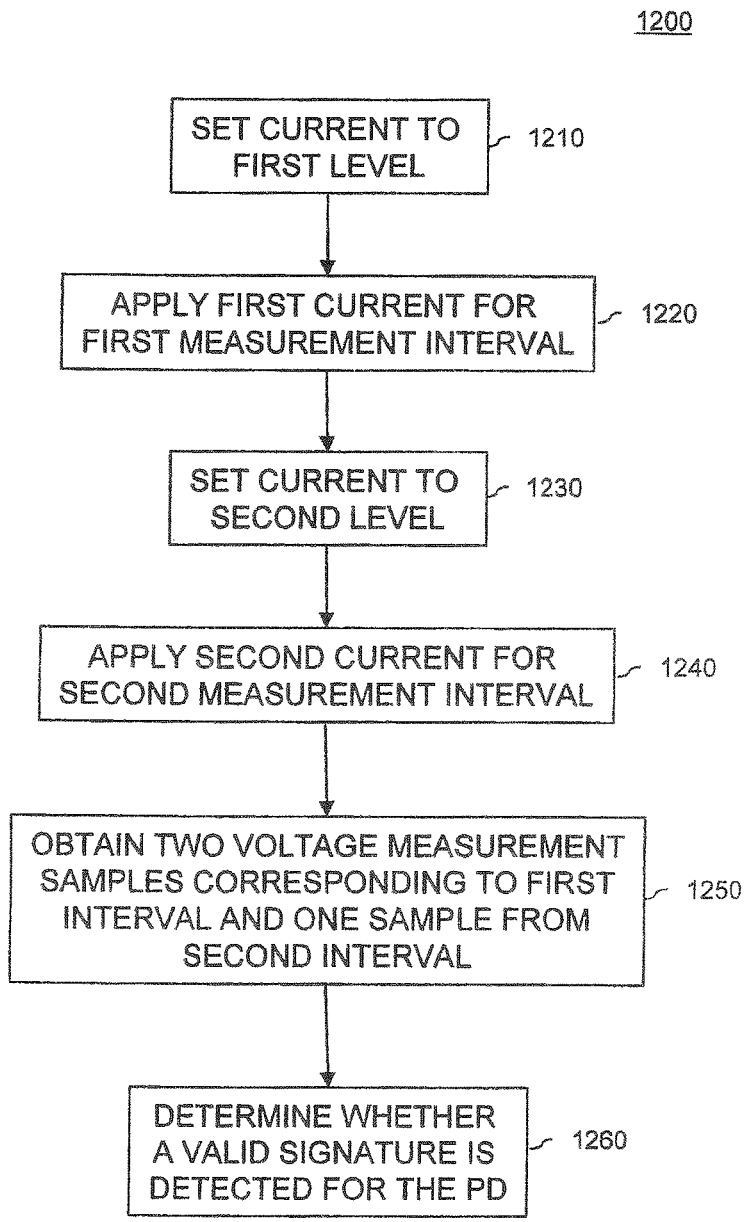
FIG. 12 depicts a flowchart of a method for two-point detection, according to embodiments of the present invention.

FIG. 12 depicts a flowchart 1200 of a method for two-point detection, according to embodiments of the present invention. Flowchart 1200 is described with continued reference to the embodiment of FIG. 3. However, flowchart 1200 is not limited to that embodiment. Note that the steps depicted in flowchart 1200 do not necessarily have to occur in the order shown.

In step 1210, the current to be applied to the link port is set to a first value. In an embodiment, detection current controller 364 transmits a signal to current source 370 to set the appropriate first current level. In an embodiment, the first current level is set to 170 µA.

In step 1220, the first current is applied to the link port for the first measurement time interval.

In step 1230, the current to be applied to the link port is set to a second value. In an embodiment, detection current controller 364 transmits a signal to current source 370 to set the appropriate second current level. In an embodiment, the first current level is set to 230 µA.

In step 1240, the second current is applied to the link port for the second measurement time interval.

Figure 13:
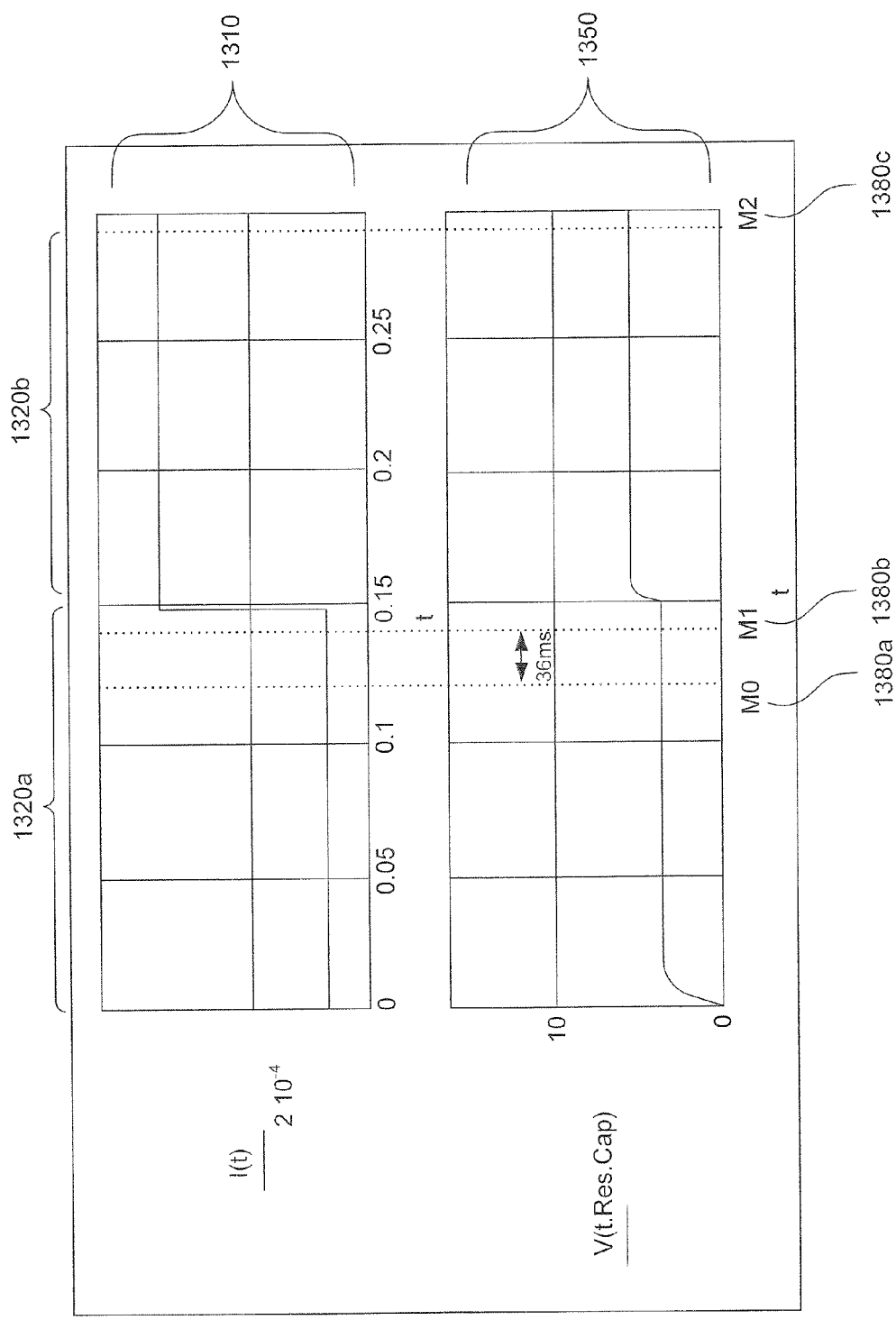
FIG. 13 depicts a typical two point detection current waveform, according to embodiments of the present invention.

FIG. 13 depicts a typical two point detection current waveform 1310, according to embodiments of the present invention. As shown in FIG. 13, current $I_0$ is applied to the link port during a first measurement time interval 1320a and a current $I_1$ is applied to the link port during a second measurement time interval 1320b. FIG. 13 also depicts the resulting detection voltage waveform 1350 measured by voltage measurement system 380, according to embodiments of the present invention.

In step 1250, two voltage measurement samples corresponding to the first measurement interval and one voltage measurement sample corresponding to the second measurement interval are obtained. In the example of FIG. 13, voltage measurements at measurement point M0 1380a and at measurement point M1 1380b are obtained for the first measurement interval. A voltage measurement at measurement point M2 1380c is obtained for the second measurement interval.

In step 1260, detection module 362 uses the three measurement samples to determine whether a valid PD signature was detected. In the two-point detection example of FIG. 13, two deltas are computed. The first is the difference in voltages associated with measurement points M2 and M1 and the second is the difference in voltages associated with measurement points M1 and M0.

$$\Delta V0 = V2 - V1$$

$$\Delta V1 = V1 - V0$$

Delta V0 is used to measure the PD signature resistance. Delta V1 is used to measure the settling of the link port voltage. A valid PD is detected if both ΔV0 is within predefined voltage limits and ΔV1 is less than or equal to a predefined settlement voltage. For example, ΔV0 must in the range of 1.5V and 2.672V and ΔV1 must be less than or equal 0.1875V.

Note that the short circuit detection described above in step 1060 and 1065 may also be performed during flowchart 1200.

3.2 Legacy Detection

Figure 14:
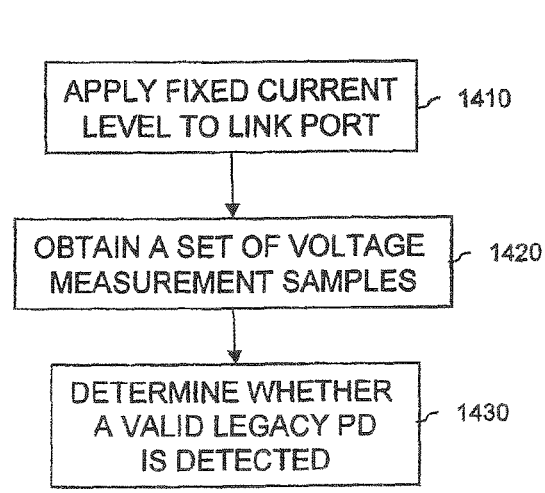
FIG. 14 depicts a flowchart of a method for legacy detection, according to embodiments of the present invention.

FIG. 14 depicts a flowchart 1400 of a method for legacy detection, according to embodiments of the present invention. In certain legacy PDs, the signature provided to the PSE is purely capacitive. The value of the capacitance is measured by applying a fixed current source and measuring the slew rate of the link port voltage. Flowchart 1400 is described with continued reference to the embodiment of FIG. 3. However, flowchart 1400 is not limited to that embodiment. Note that the steps depicted in flowchart 1400 do not necessarily have to occur in the order shown.

In step 1410, a fixed current source is activated and a fixed current level is applied to a link port. The current source charges the capacitor of the legacy powered device.

In step 1420, a set of voltage measurement samples is obtained. Based on the set of measurement samples, the value of the capacitor can be determined. In an embodiment, filtered voltage samples 830 may be obtained. In addition or alternatively, integrated voltage samples 820 may be obtained.

In step 1430, the detection module 362 determines whether a valid legacy PD was detected. During step 1430, the value of the PD capacitance is determined according to the formula:

$$C_{pd} = I_{legacy} \times \left( \frac{\Delta t}{\Delta V_{port}} \right)$$

If the PD capacitance is within a predetermined range, a valid legacy PD has been detected.

3.4 Open Circuit Detection

Figure 15:
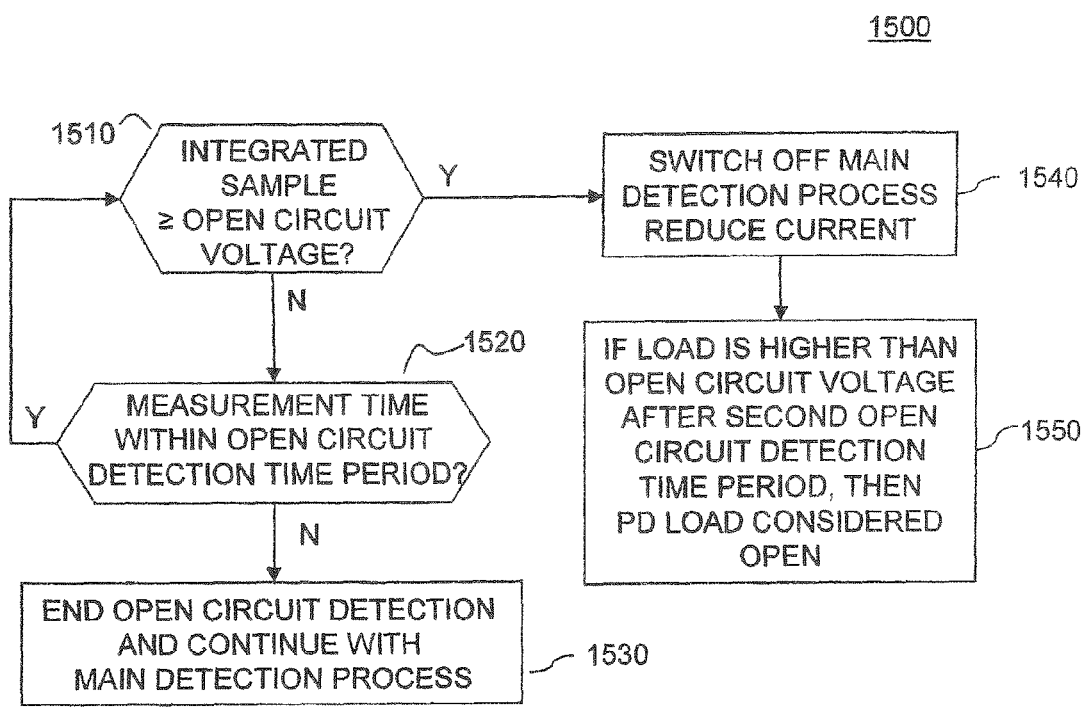
FIG. 15 depicts a flowchart of a method for open circuit detection, according to embodiments of the present invention.

A PSE also must differentiate between an Open-Circuit condition and an invalid resistance. The Open circuit detection method runs in the background with the main detection process described above in FIG. 10. FIG. 15 depicts a flowchart 1500 of a method for open circuit detection, according to embodiments of the present invention. Flowchart 1500 is described with continued reference to the embodiment of FIG. 3. However, flowchart 1500 is not limited to that embodiment. Note that the steps depicted in flowchart 1500 do not necessarily have to occur in the order shown.

In step 1510, a determination is made whether one or more of the integrated samples 820 is greater than or equal to the open circuit voltage. If at least one of the integrated samples is greater than or equal to the open circuit voltage then operation proceeds to step 1540. If none of the integrated samples is greater than or equal to the open circuit voltage, then operation proceeds to step 1520.

In step 1520, a determination is made whether the measurement time is within a first open circuit detection time period. For example, detection module 362 monitors the integrated samples in a first time period (e.g., 3*18 ms) after the start of detection for the link port. If the time is within the first open circuit detection time period, operation returns to step 1510. If the first open circuit detection time period has expired, operation proceeds to step 1530.

In step 1530, open circuit detection is ended and main detection processing continues.

In step 1540, the main detection process is switched off and the current provided to the link port is reduced.

In step 1550, if the load voltage remains higher than the open circuit voltage for a second open circuit detection time period, the PD load is considered open.

Figure 16:
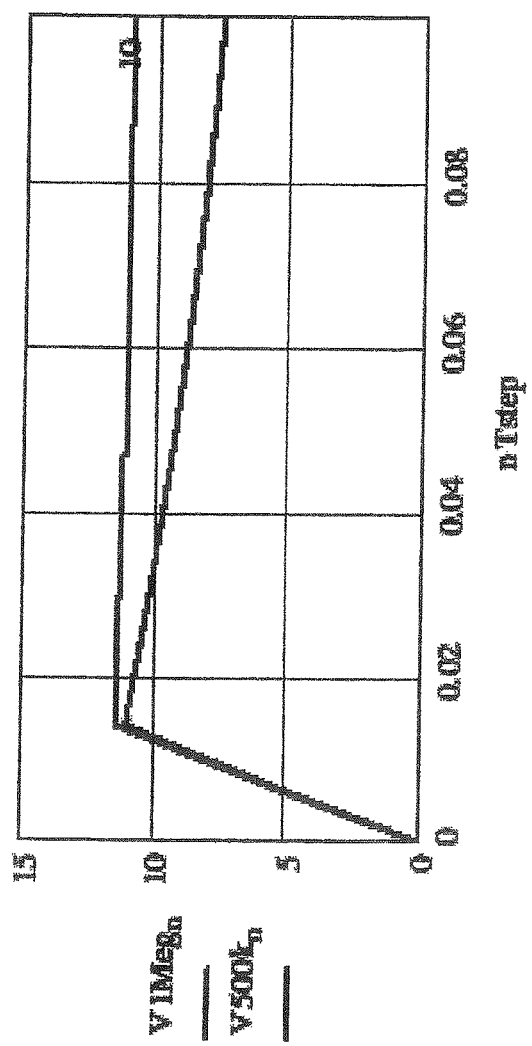
FIG. 16 depicts an exemplary open circuit condition for 500 k and 1MΩ impedances.

FIG. 16 depicts an exemplary open circuit condition for 500 k and 1MΩ impedances. For example, if after 18 ms, the voltage is higher than 10 V then the load is considered open (>500 kohm).

4. Conclusion

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method, in a power-over-Ethernet power source equipment (PSE) device, for multi-point detection of a powered device (PD), comprising:
   sequentially applying a plurality of currents or voltages to a link port of the PSE device;
   obtaining a plurality of current samples or voltage samples that correspond to respective currents or voltages applied to the link port;
   calculating a link port settling voltage for the PD by calculating a difference between a second voltage sample in the plurality of voltage samples and a first voltage sample in the plurality of voltage samples;
   calculating a signature resistance for the PD by calculating a difference between a third voltage sample in the plurality of voltage samples and the second voltage sample; and
   determining, based on the signature resistance and the link port settling voltage, whether the PD is a valid PD.

2. The method of claim 1, wherein a number of the plurality of currents or voltages corresponds to a number of current or voltage sources in the PSE device.

3. The method of claim 1, wherein determining whether the PD is the valid PD comprises:
   calculating a plurality of voltage differences between the plurality of voltage samples; and
   determining whether the calculated voltage differences are within a predefined range.

4. The method of claim 3, further comprising:
   applying an initial current or voltage; and
   applying a subsequent current or voltage at a predetermined time interval for measurement.

5. The method of claim 1, further comprising:
   setting an initial current or voltage to be applied to the link port based on a received signal from a controller in the PSE device; and
   setting an updated value for a subsequent current or voltage to be applied to the link port based on a subsequent received signal from the controller.

6. The method of claim 1, wherein determining whether the PD is the valid PD further comprises:
   determining whether the signature resistance is within a predefined voltage limit; and
   determining whether the link port settling voltage is less than or equal to a predefined settlement voltage.

7. The method of claim 1, further comprising:
   obtaining both a respective current sample and a respective voltage sample for a respective current or voltage applied to the link port.

8. The method of claim 7, further comprising:
   obtaining a respective temperature sample for the respective current or voltage applied to the link port.

9. The method of claim 1, wherein determining whether the PD is the valid PD further comprises:
   determining whether the signature resistance is within a predefined resistance range.

10. The method of claim 1, wherein determining whether the PD is the valid PD further comprises:
    determining whether a signature capacitance for the PD is within a predefined capacitance range.

11. The method of claim 10, wherein determining whether the PD is the valid PD further comprises:
    determining whether the signature resistance is within a predefined resistance range.

12. A power source equipment (PSE) device for multi-point detection of a powered device (PD), comprising:
    a current or voltage source configured to sequentially apply a plurality of currents or voltages to a link port of the PSE device;
    a measurement system configured to measure a plurality of current samples or voltage samples that correspond to respective currents or voltages applied to the link port; and
    a detection module configured to:
      calculate a link port settling for the PD by calculating a difference between a second voltage sample in the plurality of voltage samples and a first voltage sample in the plurality of voltage samples,
      calculate a signature resistance for the PD by calculating a difference between a third voltage sample in the plurality of voltage samples and the second voltage sample, and
      determine, based on the signature resistance and the link port settling voltage, whether the PD is a valid PD.

13. The PSE device of claim 12, wherein a number of the plurality of currents or voltages corresponds to a number of current or voltage sources in the PSE device.

14. The PSE device of claim 12, wherein the detection module is further configured to:
    determine whether the signature resistance is within a predefined resistance range, and
    determine whether a PD signature capacitance is within a predefined capacitance range.

15. The PSE device of claim 12, wherein the detection module is further configured to:
    calculate voltage differences between the voltage samples, and
    determine whether the calculated voltage differences are within a predefined range.

16. The PSE device of claim 12, wherein the current or voltage source is further configured to:
    apply an initial current or voltage to the link port based on a received signal from a controller in the PSE device; and
    apply a subsequent current or voltage to the link port based on a subsequent received signal from the controller.

17. The PSE device of claim 16, wherein the current or voltage source is configured to:
    apply the initial current or voltage; and
    apply the subsequent current or voltage at a predetermined time interval for measurement.

18. The PSE device of claim 12, wherein the current or voltage source is further configured to measure both a respective current sample and a respective voltage sample for a respective current or voltage applied to the link port.

19. The PSE device of claim 12, wherein the detection module is configured to determine whether the PD is the valid PD by:
    determining whether the signature resistance is within a predefined voltage limit; and
    determining whether the link port settling voltage is less than or equal to a predefined settlement voltage.

20. The PSE device of claim 12, wherein the current or voltage source is further configured to:
    measure a respective temperature sample for a respective current or voltage applied to the link port.

21. The PSE device of claim 12, further comprising an analog-to-digital converter (ADC).

22. The PSE device of claim 12, further comprising a data acquisition module configured to integrate the plurality of current samples or voltage samples.

23. An apparatus, comprising:
a current or voltage source configured to sequentially apply a plurality of currents or voltages to a link port of the apparatus;
a measurement system configured to measure a first voltage sample, corresponding to a first measurement point, a second voltage sample, corresponding to a second measurement point, and a third voltage sample, corresponding to a third measurement point, from the link port; and
a detection module configured to:
calculate a signature resistance for a device by calculating a difference between the third voltage sample and the second voltage sample,
calculate a link port is settling voltage for the device by calculating a difference between the second voltage sample and the first voltage sample, and
determine, based on the signature resistance and the link port settling voltage, whether the device is a valid powered device (PD).

24. The apparatus of claim 23, wherein the detection module is configured to determine whether the device is the valid PD by:
determining whether the signature resistance is within a predefined voltage limit; and
determining whether the link port settling voltage is less than or equal to a predefined settlement voltage.

* * * * *

UNITED STATES PATENT AND TRADEMARK OFFICE
CERTIFICATE OF CORRECTION

PATENT NO. : 8,782,442 B2  
APPLICATION NO. : 12/754400  
DATED : July 15, 2014  
INVENTOR(S) : Woo et al.

Page 1 of 1

It is certified that error appears in the above-identified patent and that said Letters Patent is hereby corrected as shown below:

In the Claims

Column 15, line 22, please replace "pluralitv" with --plurality--.

Column 16, line 17, please replace "link port settling for" with --link port settling voltage for--.

Column 17, line 20, please replace "link port is settling" with --link port settling--.

Signed and Sealed this  
First Day of December, 2015

Michelle K. Lee  
*Director of the United States Patent and Trademark Office*